May 5, 1959   J. L. RAWLINGS ET AL   2,884,831
INSTANTANEOUS READER FOR MOVING DIALS
Filed Nov. 1, 1956   2 Sheets-Sheet 1

INVENTORS
JOHN L. RAWLINGS
ALDO N. CIAFFARDINI
BY
THEIR ATTORNEYS

INVENTORS
JOHN L. RAWLINGS
ALDO N. CIAFFARDINI
BY
THEIR ATTORNEYS

United States Patent Office 2,884,831
Patented May 5, 1959

2,884,831

INSTANTANEOUS READER FOR MOVING DIALS

John Lionel Rawlings, Amherst, and Aldo Nicholas Ciaffardini, Northampton, Mass., assignors to Kollmorgen Optical Corporation, Northampton, Mass., a corporation of New York Application November 1, 1956, Serial No. 619,769

5 Claims. (Cl. 88—14)

This invention relates to dial-reading devices and more particularly to a new and improved dial-reading device for determining accurately the position of a moving indicator with respect to a scale, at any instant.

The apparatus of the present invention includes a phosphorescent screen of relatively long persistence and a light source for projecting an image of a dial or other indicator on the screen at a desired instant to provide a screen image which persists for a sufficient time to enable the indication or dial reading to be determined.

In one embodiment of the invention, a dial or scale with an adjacent pointer is momentarily illuminated by a flash from a high intensity flash tube, and an image of the dial and pointer is projected upon a phosphorescent screen, where it remains visible for a time sufficient to allow the relation between the pointer and the dial to be accurately determined.

Another embodiment of the invention utilizes a flash tube for projecting a narrow beam of light as an indicating mark. A pair of opposed mirrors, each associated with one of two objects moving with respect to each other, is interposed in the path of the light beam between the flash tube and a long persistence phosphorescent screen to direct the light onto the screen in such a manner that multiple reflections of the light beam between the mirrors multiply the relative deflections of the objects to give a readily determinable reading on the screen, even for small angles of deflection of the objects.

The advantages and utility of the instantaneous reading device of this invention will become more apparent from the following description and the accompanying drawings in which.

Figure 1:
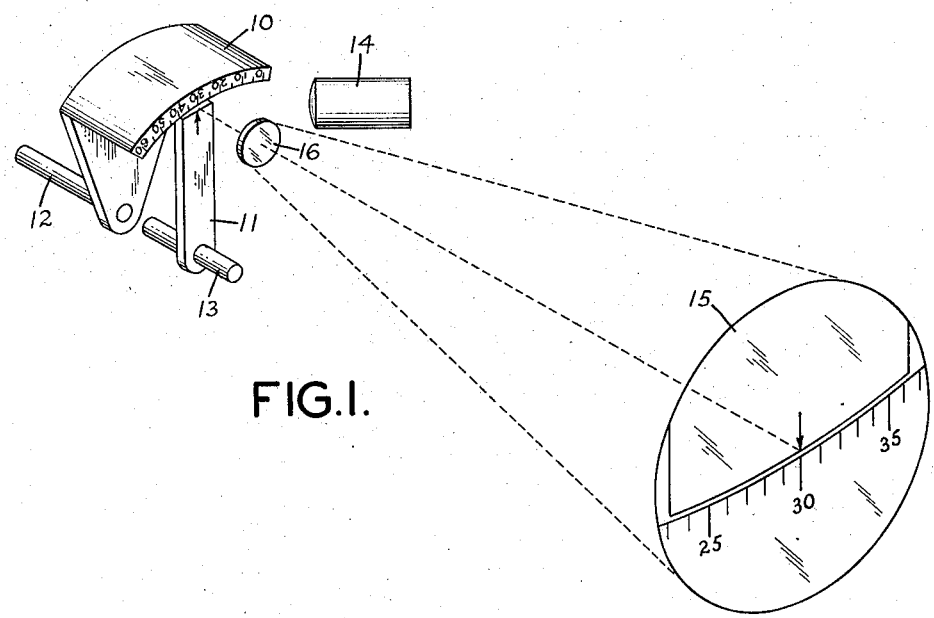
Fig. 1 is a schematic view in perspective of one preferred form of instantaneous dial reader constructed according to the invention.

Referring first to the dial reader illustrated in Fig. 1, a dial 10 and an indicator 11 are supported on two shafts 12 and 13, respectively, which may be connected by suitable means to two objects which are movable relatively (not shown), for example, the armature and stator of an electric meter. A light source capable of producing a flash of light of short duration, such as a high intensity discharge flash tube 14, is positioned to illuminate the dial 10 and indicator 11. Interposed between the dial and indicator and a screen 15, coated with a phosphorescent material which is sensitive to light from the tube 14, is a lens 16 which serves to project an image of the dial 10 and the indicator 11 on the screen.

Although the flash from the tube 14 must be of sufficiently short duration to stop appreciable motion between the dial 10 and the indicator 11, for example, less than a millisecond, the persistence of the image in the coating of the screen 15 is great enough to allow a careful and accurate reading of the dial to be made, for example, two or three seconds. Suitable phosphorescent materials for coating the screen are CdS (cadmium sulphide) or $CaSO_4$:Mn (calcium sulphate-manganese).

In operation, the flash tube 14 is discharged at the moment it is desired to make a reading, and the resulting instantaneous illumination of the dial 10 and the indicator 11 produces a persistent image on the screen 15, showing the relation of the moving objects at the time of the discharge. The image on the screen persists long enough to enable an accurate reading to be made.

Figure 2:
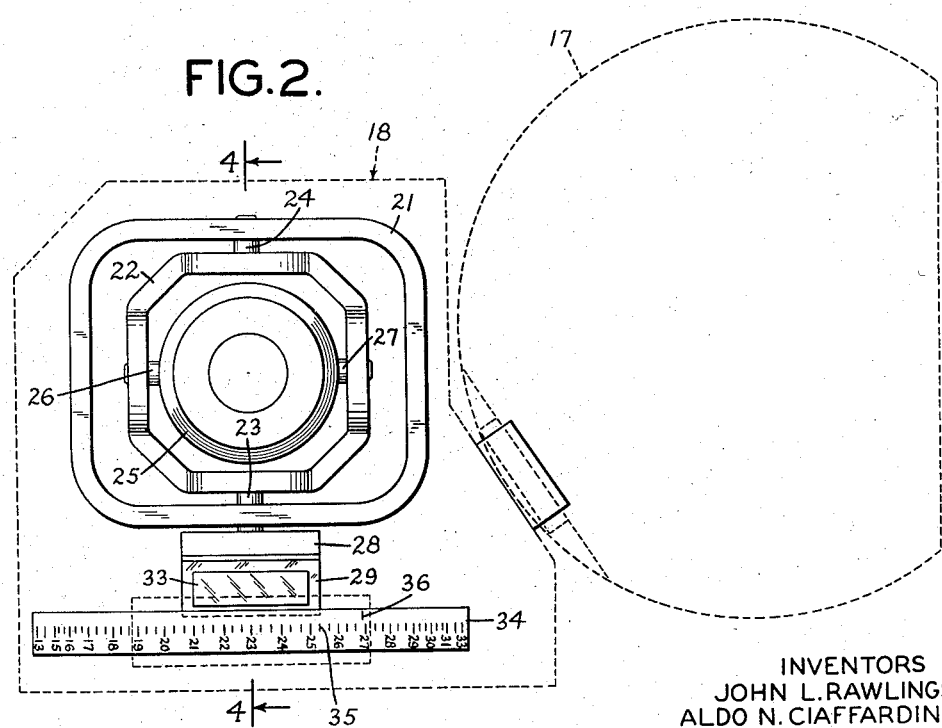
Fig. 2 is a plan view of another preferred embodiment of the invention.
Figure 3:
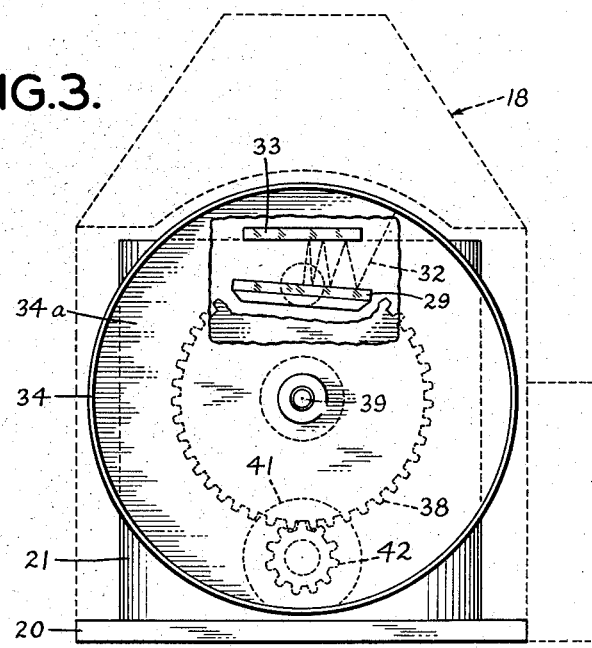
Fig. 3 is a front elevation, partially in section, of the embodiment shown in Fig. 2.
Figure 4:
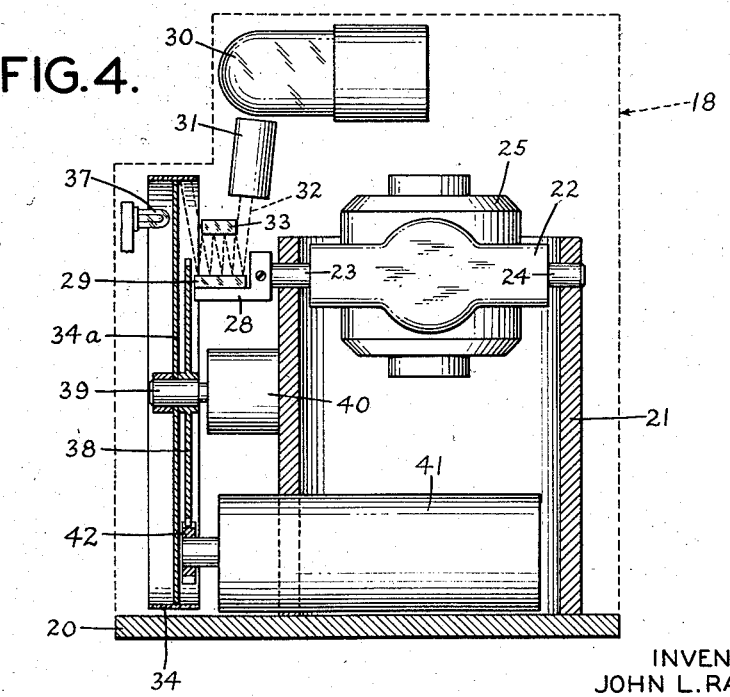
Fig. 4 is a cross-sectional view in elevation, taken on the line 4—4 of Fig. 2.

In Figs. 2, 3 and 4 there is shown another embodiment of the invention, which includes a supporting frame 17, having a nominally vertical reference centerline, on which an instrument such as a sextant, octant, sight or the like (not shown), may be supported. A vertical gyro-reference device 18 is mounted on the frame 17. The gyro-reference device 18 may be utilized, for example, to indicate at any instant the angle between the optical line of sight of a telescope mounted on the frame 17 and the true vertical or horizontal when the apparatus is subjected to a continual tilting motion. The following description is made with reference to such use, but it will be understood that this embodiment of the invention is equally useful for indicating the instantaneous relation between any fixed reference line and a moving object.

The gyro-reference device 18 comprises a base plate 20 on which there is rigidly mounted a gyroscope frame 21, supporting a gimbal 22 on two gimbal pivots 23 and 24, a gyroscope 25 being supported within the gimbal 22 on two gyroscope pivots 26 and 27. The base plate 20 is supported in fixed perpendicular relation to the vertical reference centerline of the support frame 17. In order to maintain a true or gravity vertical line of reference, the gyroscope 25 may be erected in a vertical position by an electro-magnetic pendulum and torque motors (not shown) in the usual way, so that the axis of the gyroscope pivots 26 and 27 is held on a true horizontal line. A telescope system, such as a sextant telescope, for example, whose emerging line of sight may be tilted with respect to the vertical frame centerline, is mounted on the support frame 17 so that the angle of tilt of the telescope from the frame vertical is in a plane parallel to the axis of the gyroscope pivots 26 and 27.

Attached to the gimbal pivot 23 at a point outside the gyroscope frame 21 is a block 28, to which a mirror 29 is secured in such a manner that it will turn about the axis of the gimbal pivots 23 and 24 in unison with the gimbal 22. The reflecting surface of the mirror 29 is positioned parallel to the axis of the gyroscope pivots 26 and 27, facing upwardly above the block 28, and in a plane coincident with the axis of the gimbal pivots 23 and 24. Therefore, a line on the surface of the mirror perpendicular to the axis of the pivots 23 and 24 will be maintained in a true horizontal position by the action of the gyroscope 25 when the support frame 17 is tilted with respect to the true vertical.

Positioned on the frame 17 above the mirror 29 are a high intensity discharge flash tube 30 and a collimator 31 which contains a slit mask and is positioned to direct a narrow beam of light 32 from the tube 30 toward the surface of the mirror 29, so that the beam 32 strikes the mirror on a line coincident with the axis of the pivots 23 and 24, the narrow direction of the narrow beam 32 being perpendicular thereto.

Directly above the mirror 29 another mirror 33 is supported by suitable means in fixed relation to the gyroscope frame 21, facing downwardly, with its reflecting surface in a plane perpendicular to the vertical reference centerline of the support frame 17. The beam of light 32 is directed toward the mirror 29 in a plane parallel to the vertical reference centerline of the frame 17 passing through the axis of the pivots 23 and 24 and strikes the mirror at a slight angle to the vertical, so that multiple reflection occurs between the two mirrors 29 and 33 and the reflected beam is directed upwardly toward the front of the gyro-reference device at a slight angle, where it is intercepted by a transparent drum 34, as best seen in Fig. 4.

The outer surface of the drum 34 is printed with a scale 35 calibrated in terms of the angle of declination of the telescope and the inner surface is coated with a phosphorescent material sensitive to light from the flash tube 30, so that an indicating mark 36, produced by interception of the reflected beam 32 from the flash tube, will remain visible on the drum 34 after the flash of light has been extinguished, long enough to allow accurate determination of its position with respect to the scale 35. If desired, a lamp 37 may be provided at a position within the drum 34 to illuminate the scale 35 from beneath. It should be noted that the scale 35 is on a portion of the drum on one side of the central supporting disk 34a, while the phosphor coated portion is on the opposite side of the disk 34a so that the phosphor will be shielded from the lamp 37.

Inasmuch as the gyroscope 25 maintains the mirror 29 on a true horizontal line when the support frame 17 is tilted, while the light beam 32 is directed at the mirror in a plane parallel to the vertical frame centerline, the angle of the reflected light beam to the plane of incidence is proportional to the angle of tilt of the frame 17. It will be apparent from an examination of Fig. 3 that the angle of the beam 32 to the plane of incidence is magnified by the multiple reflections between the mirrors 29 and 33, so that the reading of the telescope angle on the scale 35, as indicated by the interception of the reflected beam 32, is considerably more accurate than a direct indication would be.

In order to synchronize the position of the scale 35 with the angle of tilt of the telescope, that is, from the vertical reference centerline of the support frame 17 to the line of sight of the telescope, the drum 34 and a gear 38 are secured to an axial shaft 39 which is supported for rotation in a block 40 mounted on the gyroscope frame 22 and are rotated by means of a servomotor 41, having a pinion 42 in engagement with the gear 38. The servomotor 41 is mounted on the base plate 20. The axis of the shaft 39 is parallel to the axis of the gimbal pivots 23 and 24 in a plane perpendicular to the mirror 33 so that indications of angle produced by the reflected beam 32 are symmetric with respect to that plane. Suitable sensing means (not shown), electrically connected to the servomotor 41, are provided on the support frame 17 so that the drum 34 will be turned by the servomotor when the telescope is tilted with respect to the frame 17, thereby placing the scale 35 in a position to produce a correct indication of the angle of the telescope from the true vertical when the flash tube 30 is discharged.

If desired, means (not illustrated) may be provided to prevent the flash tube 30 from being discharged if the cross-tilt angle of the gyroscope 25 on the axis of the pivots 26 and 27 becomes excessive, thereby avoiding the possibility of error in indication of the angle of declination arising from cross-tilt of the telescope.

In operation, the gyroscope 25 is erected with its axis parallel to the true vertical by torque motors or other appropriate means. When the telescope on the support frame 17 is tilted from the vertical to observe a desired object in the line of slight, the servomotor 41 drives the drum 34 to place the scale 35 in a corresponding position.

When the vertical centerline of the frame 17 is parallel to the true vertical, the mirror 29 is held perpendicular to the plane of incidence of the beam 32 by the action of the gyroscope 25. If the tube 30 is discharged to make a reading under these conditions, the light beam 32 will undergo multiple reflection between the mirrors 29 and 33 but will remain in a vertical plane perpendicular to both mirrors and will produce an indicating mark at a position on the drum 34 in the same plane, for example, at the position "23" on the scale 35 of Fig. 2. A mark occurring at this position indicates that the angles between the telescope and the frame centerline and between the telescope and the true vertical are identical and, in this case, equal to 23 degrees.

If, however, the support 17 is tilted with respect to the true vertical so that the angle between the telescope and vertical frame centerline is not equal to the angle between the telescope and the true vertical, the mirror 29 will be positioned at an angle to the plane of the incident beam of light 32 so that the angle of reflection represents the difference between these two angles. A flash of light from the tube 30 will now be reflected by the mirrors 29 and 33 to produce an indicating mark 36, at a position away from the plane of incidence of the incident beam 32. In the example illustrated in Fig. 2 the mark 36 appears at 26 degrees, 55 minutes, to indicate the angle of declination of the telescope with respect to the true vertical at the time of the flash, while the angle with respect to the vertical reference line of the frame 17 remains at 23 degrees as indicated by the position of the scale 35 with respect to the plane of incidence. The difference between these two angles, 3 degrees, 55 minutes, represents the angle of tilt of the support frame 17 from the true vertical at the time of the flash.

Because of the relatively long persistance of the image in the phosphor coating on the drum 34, the indicating mark 36 will remain visible long enough to allow careful observation of the position of the mark with respect to the scale 35, although the support frame 17 may have tilted to another position in the meantime.

Although specific embodiments of the invention have been described and illustrated, it is to be understood that many changes and modifications which will occur to those skilled in the art are intended to be included within the scope of this invention as defined in the accompanying claims.

We claim:

1. A device for determining the position of one element of a pair of relatively movable elements with respect to the other element of said pair, comprising separate, cooperating indicating members connected to and movable relatively in response to relative movement of said elements, means for illuminating at least one of said indicating members for a period of short duration insufficient to disclose relative movement of said indicating members, optical means for projecting an image of the illuminated indicating member to a screen position, and phosphorescent screen means at that position for receiving and retaining the image of said illuminated indicating member showing its relation to the other indicating member for a period of time sufficient to enable the relative position of said indicating members to be determined and then extinguishing the image.

2. A device for determining the position of one element of a pair of relatively movable elements with respect to the other element of said pair, comprising illuminating means for producing a flash of light of short duration, projection means for projecting a beam of light from said illuminating means in a direction associated with the position of one of said elements, reflecting means associated with the position of the other of said pair of elements whereby the direction of said beam of light is changed in accordance with changes in the relative positions of the two elements, and phosphorescent means movable with said one element and positioned to intercept the beam of light from said illuminating means and capable of retaining an image of said beam for a period of time sufficient to enable the relative positions of said elements to be determined.

3. A device for determining the position of one element of a pair of relatively movable elements with respect to the other element of said pair, comprising illuminating means for producing a flash of light of short duration, projection means for projecting a beam of light from said illuminating means, reflecting means for changing the direction of said light beam in accordance with changes in the relative positions of said elements, means for magnifying said change in direction comprising opposed reflecting means, at least one of which is associated with one of said elements, whereby said beam of light is subjected to multiple reflections so that a greater change in the direction of the light beam results than the change produced by a single reflection, and phosphorescent scale means positioned to intercept the beam of light and adapted to retain an image thereof for a period of time sufficient to enable the relative position of said indicating members to be determined and then to extinguish the image.

4. A device for determining the position of one of a pair of relatively movable elements with respect to the other, comprising illuminating means capable of producing a flash of light of short duration, projection means for projecting a beam of light from said illuminating means in a direction associated with the position of one of said elements, opposed reflecting means, at least one of which is associated with the other of said elements, whereby the beam of light is subjected to multiple reflections, thereby producing a greater change in the direction of said beam than the change produced by a single reflection, and image retaining means comprising a phosphorescent screen marked with a graduated scale, movable with said one element and positioned to intercept the reflected beam of light from said illuminating means and capable of retaining a visible image from said beam of light for a period of time sufficient to enable the relative positions of said elements to be determined.

5. A device for determining the angular relation between a moving object and a fixed reference line at any instant, comprising gyroscope means for establishing said fixed reference line, first reflecting means associated with said gyroscope means, illuminating means capable of producing a flash of light of short duration, optical projection means associated with said moving object for projecting a beam of light from said illuminating means toward said first reflecting means whereby the direction of said beam of light after reflection by said first reflecting means is dependent upon the angular relation between said moving object and said fixed reference line, second reflecting means positioned adjacent said first reflecting means to cause multiple reflection of said beam of light, thereby producing a greater change in the direction of said beam than the change produced by a single reflection, and a phosphorescent screen marked with a graduated scale, positioned to intercept said beam of light after said multiple reflection and capable of retaining a visible image from said beam of light for a period of time sufficient to enable said angular relation to be determined.

References Cited in the file of this patent
UNITED STATES PATENTS

| | | |
|---|---|---|
| 1,921,630 | Mechau | Aug. 8, 1933 |
| 2,131,738 | Hoyt | Oct. 4, 1938 |
| 2,273,876 | Lutz et al. | Feb. 24, 1942 |
| 2,597,001 | Jaffe | May 20, 1952 |